Aug. 26, 1969     K. W. KAMPERT     3,462,861
BUCKET TOOTH ASSEMBLY WITH WEAR PLATE AND LOCKING SHIM
Filed Oct. 11, 1966     2 Sheets-Sheet 1
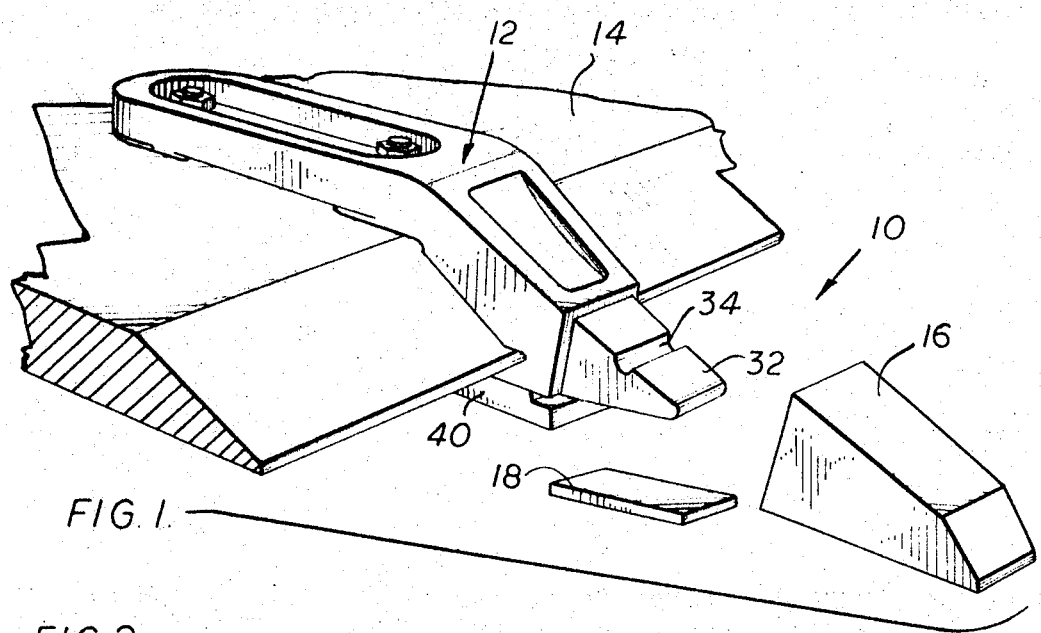
FIG. 1.
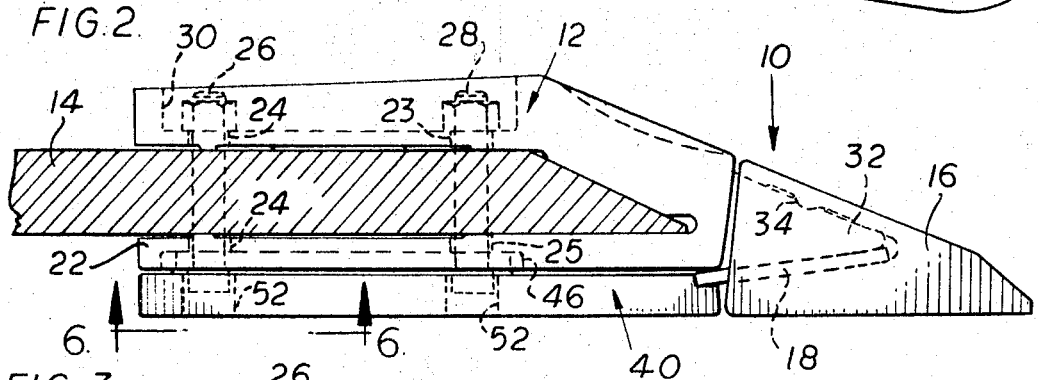
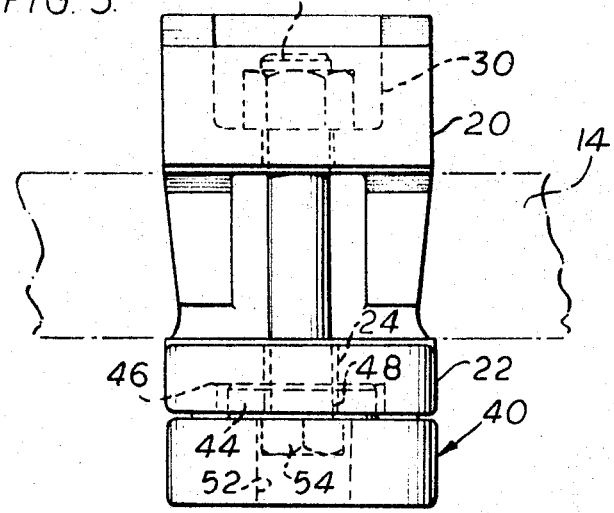
INVENTOR
KEITH W. KAMPERT
By: Richard E. Backus
ATTY Aug. 26, 1969     K. W. KAMPERT     3,462,861
BUCKET TOOTH ASSEMBLY WITH WEAR PLATE AND LOCKING SHIM
Filed Oct. 11, 1966     2 Sheets-Sheet 2
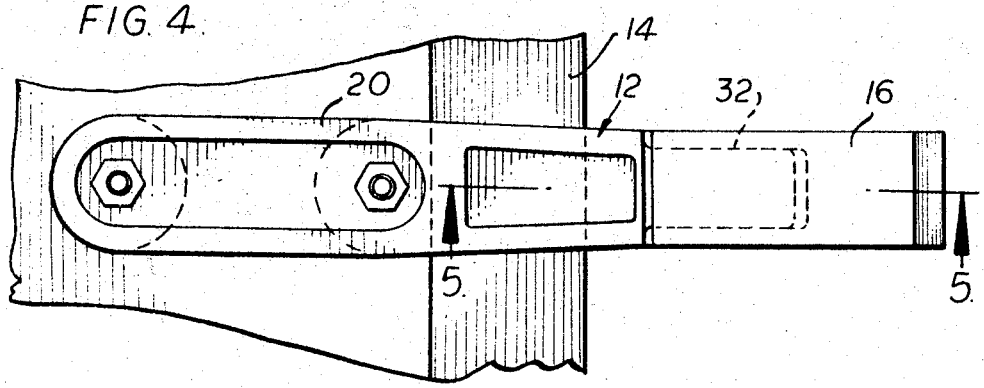
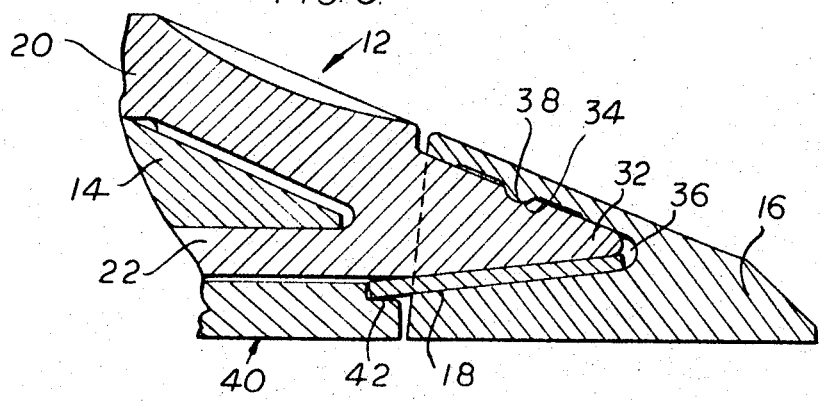
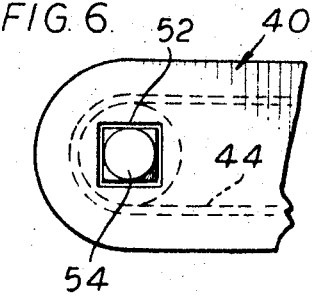
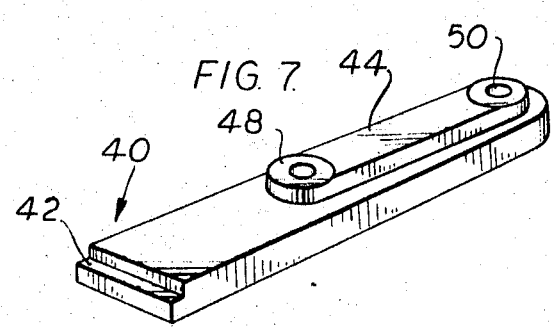
INVENTOR
KEITH W. KAMPERT
By: Richard E. Backus
ATTY United States Patent Office 3,462,861
Patented Aug. 26, 1969

3,462,861
BUCKET TOOTH ASSEMBLY WITH WEAR PLATE
AND LOCKING SHIM
Keith W. Kampert, Libertyville, Ill., assignor to International Harvester Company, Chicago, Ill., a corporation of Delaware
Filed Oct. 11, 1966, Ser. No. 585,844
Int. Cl. E02f 3/14
U.S. Cl. 37—142                                6 Claims

ABSTRACT OF THE DISCLOSURE

A bucket tooth assembly having an adaptor member with a shank, the shank having a transverse groove, a point having an internal ridge complementary with and engageable in the groove, a locking shim insertable between the point and the shank, a wear plate engageable with the locking shim and bolts insertable through the wear plate and the adaptor to both secure the tooth assembly on the bucket and to exert a force upon the locking shim to retain the point in place on the shank.

---

This invention relates to a novel bucket tooth assembly and more specifically relates to a bucket tooth assembly incorporating features to securely hold a tooth point on an adaptor shank, to permit rapid replacement of the assembly parts, to provide a substantial amount of wear surface protecting critical parts of the assembly, and to provide an economical and simplifier design having a minimum of parts.

It is an object of this invention to provide a bucket tooth assembly with a forwardly projecting point having a hollow cavity interfitting with the shank of an adaptor member which in turn is bolted to the leading edge of a bucket blade and with a novel wear plate provided below the adaptor to securely hold a locking shim between the adaptor shank and point.

Another important object of this invention is to provide a bucket tooth assembly having a point interfitting in locking engagement with the shank of an adaptor member in which a locking shim prevents translational movement of the point from the shank, in which a wear plate locks the shim in place, and in which the wear plate further shields both the shim and the bolts which hold the adaptor on the bucket blade.

It is a further object of the present invention to provide a bucket tooth assembly having a removable point secured to an adaptor member by a locking shim in which a wear plate is provided below the adaptor to hold the shim in place whereby the point and wear plate are the only members of the assembly requiring replacement due to wear thereof.

The invention also comprises other novel features which will more fully appear in the specification and drawings. It is intended that the drawing merely describes one embodiment for the present invention, which is given by way of illustration or example only.

FIGURE 1 of the drawings illustrates a partially exploded perspective view of the bucket tooth assembly of the present invention;

FIGURE 2 is a side view of the bucket tooth assembly of FIGURE 1 illustrating its mounted position on the leading edge of a bucket blade;

FIGURE 3 is a rear view of the bucket tooth assembly illustrating the adaptor member and wear plate with the bucket blade shown in phantom view;

FIGURE 4 is a top plan view of the bucket tooth assembly of FIGURE 2;

FIGURE 5 is an enlarged cross sectional view taken along the line 5—5 of FIGURE 4;

FIGURE 6 is a bottom view of a portion of the tooth assembly taken along the lines 6—6 of FIGURE 2; and FIGURE 7 is a perspective view of the wear plate of the present invention.

Referring now to the drawings, in which like reference characters designate similar parts in the several views, FIGURE 1 illustrates a bucket tooth assembly designated generally at 10. The bucket tooth assembly 10 comprises an adaptor member 12 mounted on the leading edge of bucket blade 14 and with a hardened, forwardly projecting point 16 secured in position by means of locking shim 18 and wear plate 40.

The assembled relationship of the parts of assembly 10 is shown in greater detail in FIGURE 2. The elongated adaptor member 12 comprises a support including a pair of vertically spaced upper and lower support arms 20 and 22, respectively. Each arm is provided with a plurality of bores 24 and 25, each bore being aligned with a corresponding bore in an opposing arm. A pair of bolts 26 and 28 are mounted through aligned bores in each arm and through corresponding bores provided in bucket blade 14 to securely hold the adaptor member in position. A recess 30 is provided in upper arm 20 so that the nuts of bolts 26 and 28 are lowered and protected from abrasive action of the material being worked.

A tapered, forwardly projecting shank 32 is formed at the forward margin of adaptor member 12. A transversely extending groove 34 is formed in the upper margin of shank 32.

The point 16 of the bucket tooth assembly is formed from a suitable material such as hardened steel and is provided with an internal cavity 36 best shown in FIGURE 5. The cavity 36 opens rearwardly and is adapted for interfitting engagement with shank 32. A downwardly protruding and laterally extending projection 38 is formed on the upper surface of the cavity. Projection 38 engages the corresponding groove 34 of the shank to provide a centering function for point 16 while simultaneously preventing forward movement of the point with respect to the shank. Elongated shim 18 is fitted between the lower surface of shank 32 and the bottom of cavity 36 to prevent translational movement of the projection from the groove, thereby serving to lock the point onto the shank. The shim in turn is locked in position by means of wear plate 40 mounted below the lower support arm 22. A notch 42 formed on the forward end of the wear plate engages the rear end of shim 18 and prevents translational movement thereof.

Details of wear plate 40 are illustrated in FIGURE 7. An upwardly extending ridge 44 is formed on the upper surface of the wear plate and functions to center the wear plate with respect to support arm 22 by interlocking with a recess 46 (FIGURES 2 and 3) formed in said support arm. A pair of holes 48 and 50 are formed in the wear plate to receive the bolts 26 and 28 for securing the wear plate to the lower arm. As illustrated in FIGURES 2 and 3 the bores are countersunk at 52 to receive the bolt heads 54. This insures that the metal in the wear plate extending beyond the bolt heads will protect the bolts from abrasive action of the material being worked.

As shown in FIGURE 5 the tooth point 16 is also provided with a substantial amount of metal at its lower surface. This serves to protect the shim 18 from the abrasive action of the material and thus extends the life of the tooth assembly. Since the tooth point and wear plate protect the adaptor members, shim, and bolts from such abrasive action then the only members of the assembly requiring replacement are the point and wear plate. Such replacement can be readily accomplished since the assembly 10 may be completely disassembled through the removal of the bolts 26 and 28.

In view of the foregoing description it is clear that applicant has provided a new and improved bucket tooth assembly comprising a minimum of inexpensive parts which are uncomplicated in design and which may be readily disassembled and assembled to replace worn parts thereof. Additionally there has been provided a reliable bucket tooth assembly in which the only parts requiring replacement are the tooth point and wear plate which serve to protect other elements of the assembly.

While the embodiment herein is at present considered to be preferred it will be understood that numerous variations and modifications may be made by those skilled in the art.

What is claimed is:

1. A tooth assembly of the character described for use with the forward edge of a digging bucket, the assembly comprising the combinaton of: an adaptor member having a rearwardly extending support and a forwardly projecting tapered shank; securing means for holding the support to the bucket edge; a tooth point having a cavity opening rearwardly and interfitting with the shank; locking means for engaging the shank with the point to prevent forward movement of the point with respect to the shank; a shim positioned between the lower margin of the shank and bottom of the point cavity to hold the locking means in engagement, said shim extending beyond the shank and beneath the support; and, an elongated wear plate positioned below the support and in engagement with the shim to lock the shim between the shank and point, said securing means further locking the wear plate to the support and clamping the shim between the support and the wear plate, said clamping causing a bending force to be applied to said shim which aids in holding said locking means engaged.

2. The invention as defined in claim 1 wherein: the locking means comprises a transversely extending ridge projecting downwardly into the cavity, and the shank is provided with a transversely extending groove in its upper margin in complementary engaging relationship with the ridge.

3. The invention as defined in claim 1 wherein: the support comprises a pair of spaced upper and lower arms, the bucket edge being positioned between the arms and each arm being provided with a plurality of bores, each bore being aligned with a corresponding bore of the opposing arm; the wear plate being provided with a plurality of holes, each hole being aligned with a corresponding bore of the support; and, the securing means comprises a plurality of bolts, each bolt being positioned in a pair of aligned bores in the support and a corresponding hole in the wear plate and extending through the bucket edge.

4. The invention as defined in claim 3 wherein: each hole in the wear plate is countersunk at its lower margin, and the bottom end of each bolt is positioned in the countersunk portion of the hole to protect said bottom end from wear.

5. The invention as defined in claim 1 wherein: the point is provided with a lower surface extending downwardly below the lower margin of the adaptor, and the lower margin of the wear plate is aligned behind said lower surface of the point to protect the shim from wear.

6. The invention as defined in claim 5 wherein: the wear plate is provided with a notch at the forward end of its upper margin, said notch abutting the shim to prevent rearward movement thereof relative to the shank.

References Cited

UNITED STATES PATENTS

| | | | |
|---|---|---|---|
| 1,220,186 | 3/1917 | Chambers | 37—142 |
| 1,553,096 | 9/1925 | Mullally | 37—142 |
| 1,620,132 | 3/1927 | Psilander | 37—142 |
| 3,006,089 | 10/1961 | Johnson | 37—142 |
| 3,020,655 | 2/1962 | Launder | 37—142 |

EDGAR S. BURR, Primary Examiner